United States Patent
Ko et al.

(10) Patent No.: US 11,294,496 B2
(45) Date of Patent: Apr. 5, 2022

(54) OPERATION METHOD BASED ON TOUCH INPUT AND ELECTRONIC DEVICE THEREOF

(71) Applicant: Samsung Electronics Co., Ltd., Gyeonggi-do (KR)

(72) Inventors: Seunghoon Ko, Gyeonggi-do (KR); Daehyun Yoo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/975,532

(22) PCT Filed: Aug. 5, 2020

(86) PCT No.: PCT/KR2020/010322
§ 371 (c)(1),
(2) Date: Aug. 25, 2020

(87) PCT Pub. No.: WO2021/025456
PCT Pub. Date: Feb. 11, 2021

(65) Prior Publication Data
US 2021/0041979 A1    Feb. 11, 2021

(30) Foreign Application Priority Data
Aug. 5, 2019    (KR) .................. 10-2019-0095215

(51) Int. Cl.
*G06F 3/041*    (2006.01)
*G06F 3/0488*    (2013.01)
(Continued)

(52) U.S. Cl.
CPC .......... *G06F 3/0416* (2013.01); *G06F 3/016* (2013.01); *G06F 3/044* (2013.01); *G06F 3/04883* (2013.01)

(58) Field of Classification Search
CPC .... G06F 3/0416; G06F 3/04883; G06F 3/044; G06F 3/016; G06F 3/03547; G06F 2203/04108; G06F 3/041
See application file for complete search history.

(56) References Cited

U.S. PATENT DOCUMENTS 9,323,383 B2    4/2016    Yeh et al.
9,569,046 B2    2/2017    Kim et al.
(Continued)

FOREIGN PATENT DOCUMENTS

EP    3605278    2/2020
KR    1020150081140    7/2013
(Continued)

OTHER PUBLICATIONS

International Search Report dated Nov. 27, 2020 issued in counterpart application No. PCT/KR2020/010322, 15 pages.

*Primary Examiner* — Grant Sitta
(74) *Attorney, Agent, or Firm* — The Farrell Law Firm, P.C.

(57) ABSTRACT

An electronic device is provided, which includes a touch panel; a display; a cover window disposed on the touch panel, wherein the cover window includes a first region corresponding to the touch panel and a second region corresponding to a region outside the touch panel, and wherein the first region includes a first sub-region corresponding to an inner region of the touch panel and a second sub-region corresponding to an outer region of the touch panel; and a processor configured to provide a UI through the display, obtain a signal of a touch input from the touch panel, determine a region in which the touch input initially occurred, based on the signal, determine a type of the input based on the region in which the touch input initially (Continued)

occurred, and execute an event corresponding to the determined type of the touch input, based on the user interface.

19 Claims, 11 Drawing Sheets

(51) Int. Cl.
*G06F 3/044* (2006.01)
*G06F 3/01* (2006.01)
*G06F 3/04883* (2022.01)

(56) References Cited

U.S. PATENT DOCUMENTS

| | | | | |
|---|---|---|---|---|
| 10,061,399 | B2* | 8/2018 | Bushnell | G04G 21/08 |
| 10,474,195 | B2* | 11/2019 | Lasyath | G06F 1/1684 |
| 2009/0295753 | A1 | 12/2009 | King et al. | |
| 2017/0090614 | A1* | 3/2017 | Kuboyama | G06F 1/163 |
| 2017/0329511 | A1* | 11/2017 | Ueno | G06F 3/04883 |
| 2018/0052428 | A1* | 2/2018 | Abramov | G04C 3/001 |
| 2018/0095501 | A1* | 4/2018 | Lasyath | G06F 1/163 |
| 2018/0343023 | A1 | 11/2018 | Park et al. | |
| 2019/0079635 | A1 | 3/2019 | Hua et al. | |
| 2019/0102001 | A1* | 4/2019 | O'Connor | G06F 3/044 |

FOREIGN PATENT DOCUMENTS

| | | |
|---|---|---|
| KR | 1020130099717 | 9/2013 |
| KR | 1020140106996 | 9/2014 |
| KR | 1020150095540 | 8/2015 |
| KR | 1020170107872 | 9/2017 |
| KR | 1020180120036 | 11/2018 |
| KR | 1020180124235 | 11/2018 |
| KR | 102057981 | 12/2019 |

\* cited by examiner

OPERATION METHOD BASED ON TOUCH INPUT AND ELECTRONIC DEVICE THEREOF

PRIORITY

This application is a National Phase Entry of International Application No. PCT/KR2020/010322, which was filed on Aug. 5, 2020, and claims priority to Korean Patent Application No. 10-2019-0095215, filed in the Korean Intellectual Property Office on Aug. 5, 2019, the content of each of which is incorporated herein by reference.

BACKGROUND

1. Field

The disclosure relates generally to an operation method based on a touch input and an electronic device thereof.

2. Description of the Related Art

A wearable device, e.g., a wrist wearable electronic device such as a smart watch, has a display for displaying content. Displays of wearable electronic devices are commonly touch screen displays. However, because wearable electronic devices often have smaller screens than common smartphones or tablets, touch input functionality may be limited. Accordingly, a mechanical or electromechanical input part such as a crown or a wheel may be added to a wearable electronic device in order to assist with touch inputs.

A touch screen display may include a display panel for outputting content and a touch panel for recognizing a touch input. A touch panel generally recognizes a touch input and determines the coordinates thereof by sensing a change of capacitance. Further, a touch panel differentiate different types of touch inputs, such as a direct touch input or a hovering touch input based on the magnitudes of changes of capacitance even though the touch inputs may be received at the same position on the touch screen display.

Wearable electronic devices often use the metal frame forming the sides thereof as an antenna to support cellular network communication. However, when a rotary wheel is disposed on the metal frame, the radiation performance of the antenna may be deteriorated. Further, when the rotary wheel is simply removed, touch input functionality decreases. An aspect of the disclosure is to provide an electronic device and method for accurately selecting an object displayed on a display using a touch input received in an outer region or a bezel region of the display.

SUMMARY

In accordance with an aspect of the disclosure, an electronic device is provided, which includes: a touch panel a display; a cover window disposed on the touch panel, the cover window including a first region corresponding to the touch panel and a second region corresponding to a region outside the touch panel, and wherein the first region includes a first sub-region corresponding to an inner region of the touch panel and a second sub-region corresponding to an outer region of the touch panel, and a processor configured to: provide a user interface through the display; obtain a signal corresponding to a touch input from the touch panel while the user interface is provided, determine a region in which the touch input initially occurred, based on the signal, in response to determining that the touch input initially occurred in the first sub-region, determine whether the touch input is greater than a first critical value, identify the touch input as a first type of touch in response to the touch input being greater than the first critical value, and execute an event corresponding to the first type touch, based on the user interface, and in response to determining that the touch input initially occurred in the second sub-region or the second region, determine whether the touch input includes movement of touch coordinates identify the touch input as a second type of touch in response to the fact that the touch input including the movement of the touch coordinates; and execute an event corresponding to the second type of touch, based on the user.

In accordance with another aspect of the disclosure, a method is provided for controlling an electronic device including a cover window, a touch panel, and a display. The method includes providing a user interface through the display; obtaining a signal corresponding to a touch input from the touch panel while the user interface is provided; determining a region in which the touch input initially occurred, based on the signal;

In response to determining that the touch input initially occurred in a first sub-region corresponding to an inner region of the touch panel, determining whether the touch input is greater than a first critical value, identifying the touch input as a first type of touch in response to the touch input being greater than the first critical value, and executing an event corresponding to the first type of touch, based on the user interface; and in response to determining that the touch input initially occurred in a second sub-region corresponding to an outer region of the touch panel or in a second region corresponding to a region outside the touch panel, determining whether the touch input includes a movement of touch coordinates, identifying the touch input as a second type of touch in response to the touch input including the movement of the touch coordinates, and executing an event corresponding to the second type of touch, based on the user interface.

Various respective aspects and features of the invention are defined in the appended claims. Combinations of features from the dependent claims may be combined with features of the independent claims as appropriate and not merely as explicitly set out in the claims.

Furthermore, one or more selected features of any one embodiment described in this disclosure may be combined with one or more selected features of any other embodiment described herein, provided that the alternative combination of features at least partially alleviates the one or more technical problem discussed in this disclosure or at least partially alleviates a technical problem discernable by the skilled person from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

It is an aim of certain embodiments of the invention to solve, mitigate or obviate, at least partly, at least one of the problems and/or disadvantages associated with the prior art. Certain embodiments aim to provide at least one of the advantages described below.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION OF EXEMPLARY EMBODIMENTS

Various embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
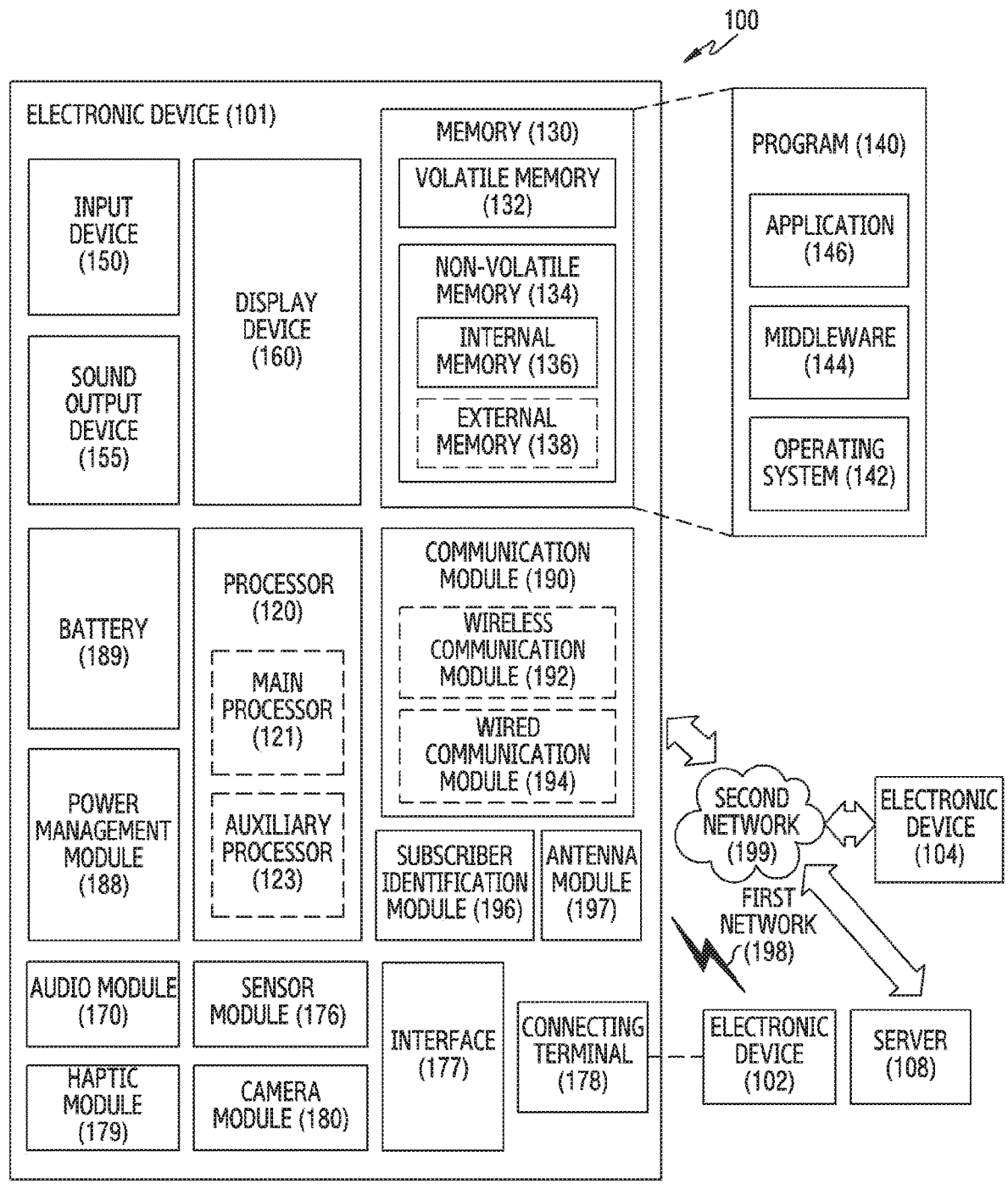
FIG. 1 illustrates a block diagram of an electronic device in a network environment according to an embodiment.

FIG. 1 illustrates an electronic device 101 in a network environment 100 according to an embodiment. Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. Alternatively, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 includes a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 includes the volatile memory 132 and/or the non-volatile memory 134.

The program 140 may be stored in the memory 130 as software, and includes, for example, an operating system (OS) 142, middleware 144, and an application 146.

The input device 150 may receive a command or data to be used by another component (e.g., the processor 120) of the electronic device 101, from the outside (e.g., a user) of the electronic device 101. The input device 150 may include a microphone, a mouse, a keyboard, or a digital pen (e.g., a stylus pen).

The sound output device 155 may output sound signals to the outside of the electronic device 101. The sound output device 155 may include a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, ISPs, and/or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 includes a wireless communication module 192 (e.g., a cellular communication module, a short-range wireless communication module, or a global navigation satellite system (GNSS) communication module) and a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Alternatively, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used.

An electronic device according to an embodiment may be a portable communication device (e.g., a smartphone), a computer device, a portable multimedia device, a portable medical device, a camera, a wearable device, or a home appliance, but is not limited to these examples.

Various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Terms such as "1st" and "2nd," or "first" and "second" may be used to simply distinguish a corresponding component from another, and do not limit the components in other aspect (e.g., importance or order). If an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) described herein may include a single entity or multiple entities. One or more of the components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
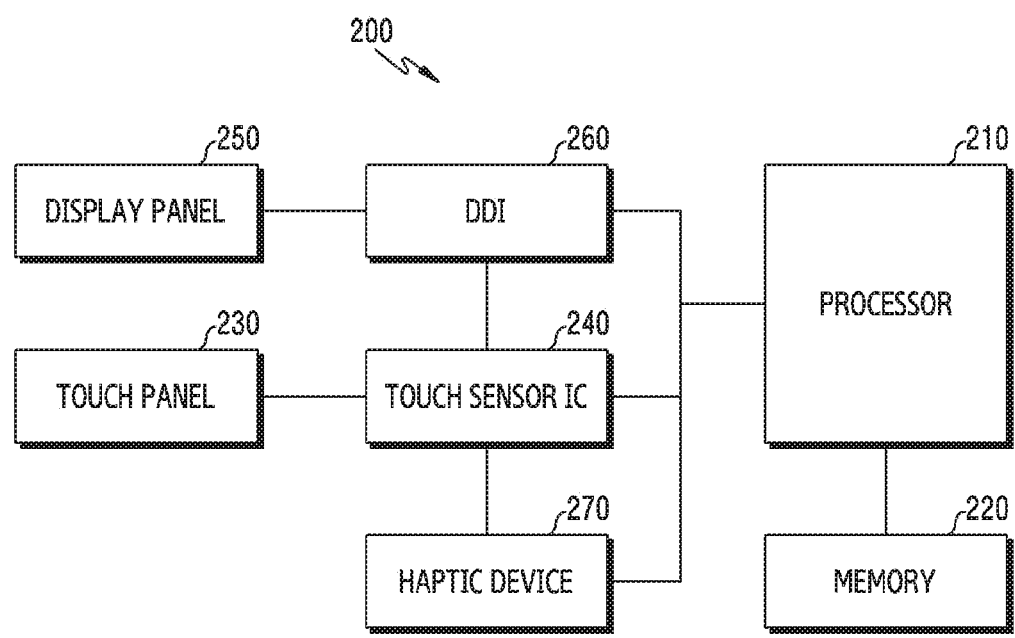
FIG. 2 illustrates a block diagram of an electronic device according to an embodiment.

FIG. 2 illustrates an electronic device according to an embodiment.

Referring to FIG. 2, an electronic device 200 includes a processor 210, a memory 220, a touch panel 230, a touch sensor IC 240, a display 250, a display driver IC (DDI) 260, and a haptic device 270. Alternatively, the electronic device 200 may omit one or more of the components or may additionally include other components.

The processor 210 can control the entire operation of the electronic device 200. The processor 210 can execute applications that provide messages, alarms, photographs, advertisements, the Internet, games, videos, etc. The processor 210 may include one processor core or a plurality of processor cores.

The processor 210 can recognize signals of other components of the electronic device 200 or can receive data from other components of the electronic device 200. The processor 210 can perform calculation, based on signals or data of other components of the electronic device 200, or a combination of the signals and data. The processor 210 can store the result of calculation in the memory 220. The processor 210 can transmit commands to other components of the electronic device 200, based on the result of calculation. The processor 210 can control the operations of other components of the electronic device 200 by transmitting commands to the other components of the electronic device 200.

The processor 210 can process data or signals that are generated by applications. The processor 210 can process the commands stored in the memory 220 to execute or control applications.

The memory 220 may include a volatile or a nonvolatile memory. The memory 220 can keep various data that are used by at least one component (e.g., the processor 210) of the electronic device 200.

The touch panel 230 may include a plurality of touch sensors or channels that generate sensing signals (e.g., a touch sensing signal and an access sensing signal). The touch panel 230 can transmit a sensing signal to the touch sensor IC 240.

The touch sensor IC 240 can control the touch panel 230 to sense touch input or hovering input at a specific position on the display 250. The touch sensor IC 240 can sense touch input or hovering input by measuring a change of a signal (e.g., voltage, a light amount, resistance, or the amount of charge) at a specific position on the display 250. The touch sensor IC 240 can provide information (e.g., a position, an area, pressure, or time) about the sensed touch input or hovering input to the processor 210. Alternatively, the touch sensor IC 240 may be included as a DDI 260, a part of the display 250, or a part of the processor 210.

The display 250 can display images corresponding to the data generated by the processor 210.

The DDI 260 can receive image information including image data or an image control signal corresponding to a command for controlling image data from other components of the electronic device 200 through an interface module. The image information can be received from the processor 210. The DDI 260 can communicate with the touch sensor IC 240 through the interface module.

The display 250 and the touch panel 230 may be implemented by a screen. When the display 250 and the touch panel 230 are implemented by a screen, the touch panel 230 may be disposed over the display 250, may be disposed under the display 250, or may be disposed in the display 250.

The haptic device 270 can generate vibration in response to a signal generated by the processor 210. The processor 210 can control the haptic device 270 to generate vibration, based on a signal generated from the touch panel 230.

According to an embodiment, the processor 210 may be understood as a control unit. The processor 210 according to an embodiment may include at least one of an AP (application processor) and a CP (communication processor) that controls the functions of the electronic device 200. According to an embodiment, the memory 220 may be understood as a storage unit. The memory 220 according to an embodiment may be understood as various type of storage units that store data of the electronic device 200. The display panel 250 may understood as a display unit. The display panel 250 may include a display unit that displays contents on a screen of the electronic device 200.

Figure 3:
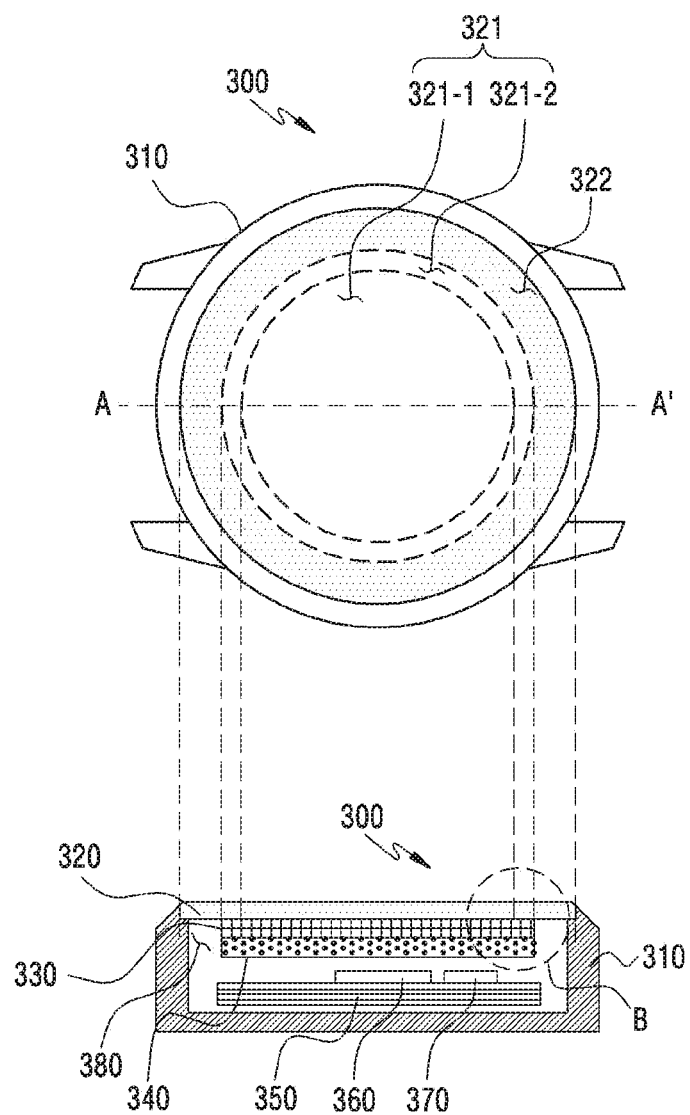
FIG. 3 illustrates a cross-section of a region where touch input is generated in the electronic device according to an embodiment.

FIG. 3 illustrates a cross-section (A-A') of a region where a touch input occurs in an electronic device according to an embodiment.

Referring to FIG. 3, an electronic device includes a housing 310, a cover window 320 forming the surface of the housing 310, a touch panel 330 disposed under the cover window 320, a display 340 disposed under the cover window 320 and seen from the outside through the cover window 320, a circuit board 350 in the housing, at least one processor 360 mounted on the circuit board 350, and/or a haptic device 370 mounted on the circuit board 350.

The touch panel 330 may be disposed under or on the display 340. The display and the touch panel 330 may be integrally formed. The electronic device 300 may include a touch screen panel (TSP) in which the display 340 and the touch panel 330 are integrally formed.

When the electronic device 300 executes an application kept in a memory, the UI of the application can be displayed through the display 340.

A touch sensor IC can receive a signal generated by touch input from the touch panel 330 and obtain data about the position where the touch input occurs, based on the signal generated by the touch input. The processor 360 can receive the data about position information from the touch sensor IC. The touch sensor IC may be included as a part of the processor 360. In the following description, the operation of the touch sensor IC is included in the operation of the processor for the convenience of description.

A touch input may be generated by an external object that the touch panel 330 can sense, such as a finger of a user, a touch pen, or a stylus pen.

The touch panel 330 may be composed of a plurality of channels and the processor 360 can determine the positions where a touch input occurs, based on signals generated from the channels. For example, when a signal is generated at a first channel disposed at a first position of the channels by touch input, the touch panel 330 can determine that the touch input has occurred at the first position of the touch panel, based on the signal generated at the first channel disposed at the first position.

The processor 360 can determine that touch input has occurred in a specific region of the touch panel 330 in response that the magnitude of a signal generated at the touch panel 330 exceeds a predetermined critical value.

The processor 360 of the electronic device 300 may be operationally combined with the memory, the display 340, and/or the touch panel 330 and can control a UI that corresponds to the position of touch input obtained through the touch panel 330, based on the position of the touch input.

The processor 360 can provide a UI related to touch input while the processor 360 is activated or inactivated. For example, even though the processor 360 is in a sleep mode, the processor 360 can sense touch input through the touch panel 330.

The processor 360 can provide a UI related to touch input while the display 340 is activated or inactivated. For example, even though the display 340 is turned off, the processor 360 can sense touch input through the touch panel 330. As another example, the processor 360 can sense touch input through the entire region of the touch panel 330 in a mode in which only a portion of the display 340 is activated (Always on Display (AOD) mode).

The portion related to a wheel event in the UI displayed on the display 340 can be operated by touch input. For example, a UI includes an object that can be scrolled or rotated, the processor 360 can control the object to be scrolled or rotated, based on touch input through the touch panel 330.

The cover window 320 is disposed on the touch panel 330 and the display 340 and can protect the touch panel 330 and the display 340 from an external shock. The cover window 320 may be made of a transparent material (e.g., a polymer or glass), so the display 340 can be seen from the outside through the cover window 320.

The cover window 320 has a first region 321 corresponding to the touch panel 330 (or the display 340) and a second region 322 corresponding to a region 380 in which the touch panel 330 (or the display 340) does not exist. The second region 322 of the cover window 320 is a region not overlapping the touch panel, and the touch panel 330 and the display 340 may not be disposed under the second region 322.

The first region 321 of the cover window 320 has a first sub-region 321-1 corresponding to a first group of the channels of the touch panel 330 and a second sub-region 321-2 corresponding to a second group of the channels of the touch panel 330. The second group may correspond to outer channels of the channels of the touch panel 330 and the first group may correspond to channels excluding the outer channels of the channels of the touch panel 330. The second group may correspond to outermost channels disposed the most outside of the channels of the touch panel 330 and the first group may correspond to channels excluding the outermost channels of the channels of the touch panel 330.

A touch input may be generated on the cover window 320 and the processor 360 can determine where the touch input has occurred on the cover window 320 through the touch panel 330 disposed under the cover window 320. For example, the processor 360 can determine which one of the first sub-region 321-1, the second sub-region 321-2, or the second region 322 of the cover window 320 the touch input has occurred in, through the touch panel 330.

A touch input may include hovering input. When the processor 360 senses the hovering input, the touch input may not be generated on the surface of the cover window 320. For example, the touch input may be generated when the user's finger is placed within a predetermined distance from the surface of the cover window 320. Depending on a critical value for sensing a touch input, a hovering input that is generated away from the surface of the cover window 320 and is lower in sensitivity than touch that is generated on the surface of the cover window 320 can also be sensed by the processor 360.

A touch input that the processor 360 can sense through the touch panel 330 may include a first type of touch and a second type of touch.

The first type of touch may be directly input to a region of a UI to be controlled. For example, when the processor 360 senses a first type of touch through the touch panel 330, the processor 360 can select, move, scroll, enlarge, or reduce an object in the UT corresponding to the region in which the first type of touch has been sensed.

A second type of touch may be input to a region different from the UI to be controlled and indirectly controls the UI. The second type of touch, which is a touch input generating a wheel event, may include an initial touch and a subsequent touch with the initial touch maintained. For example, the second type of touch may be a touch input that moves along the edge of the cover window 320 with an initial touch maintained. The initial touch of the second type of touch may be generated in the second sub-region 321-2 as well as the second region 322.

For example, when the processor 360 senses a second type of touch in the second region 322 through the touch panel 330, the processor 360 can select, change, switch, move, scroll, enlarge, or reduce an object in the UI corresponding to the first region 321, not to the second region 322 in which the second type of touch has been sensed. As another example, when the processor 360 senses a second type of touch in the second sub-region 321-2 through the touch panel 330, the processor 360 can select, change, convert, move, scroll, enlarge, or reduce a portion or the entire of the UI corresponding to the first sub-region 321-1, not to the second sub-region 321-2 in which the second type of touch has been sensed.

In response to a second type of touch sensed through the touch panel 330, the processor 360 can execute an event corresponding to the second type of touch. The event corresponding to the second type of touch may include an operation that selects, changes, switches, moves, scrolls, enlarges, or reduces a portion or the entire of a UI. For example, the processor 360 can switch a first application that is being displayed on the display 340 with a second application different from the first application in response to a second type of touch at the point in time of an input of the touch.

An event corresponding to the second type of touch may include an operation that does not change an object in a UI. For example, an operation that changes the brightness of the display 340 or adjusts the volume of a multimedia application may not cause a change of an object in a UI.

The haptic device 370 can generate vibration in response to touch input. When the processor 360 senses touch input through the touch panel 330, the processor 360 can provide feedback corresponding to the touch input to a user by vibrating the electronic device 300 through the haptic device 370. When touch input that the processor 360 senses through the touch panel 330 is a second type of touch, the processor 360 can control the haptic device 370 to generate a vibration, based on at least one of the movement distance of the touch input, the intensity of the touch input, duration time of the touch input, etc.

Figure 4A:
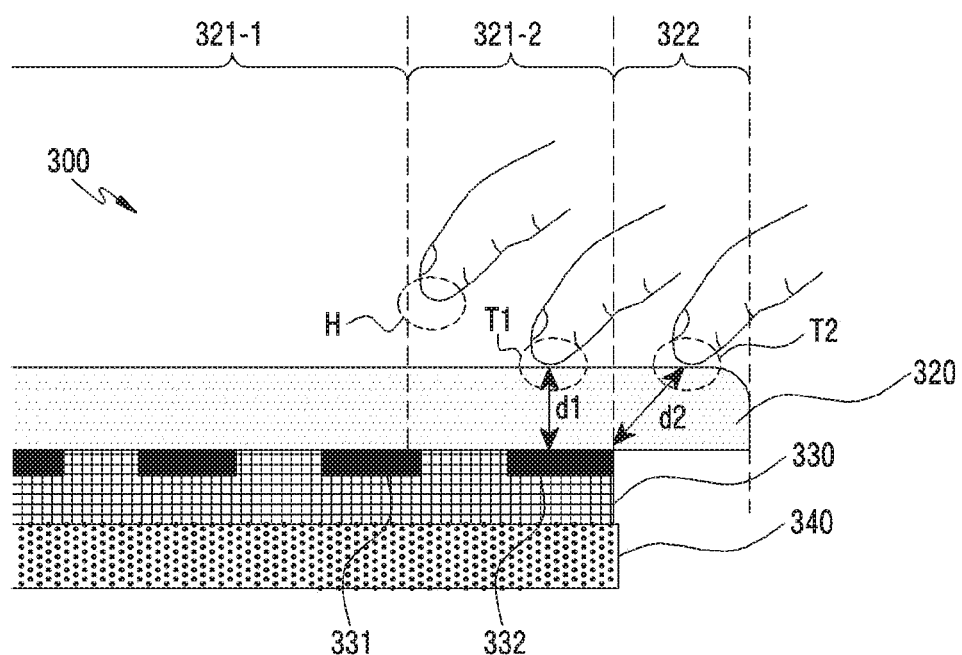
FIG. 4A illustrates an enlargement of area B in FIG. 3.
Figure 4B:
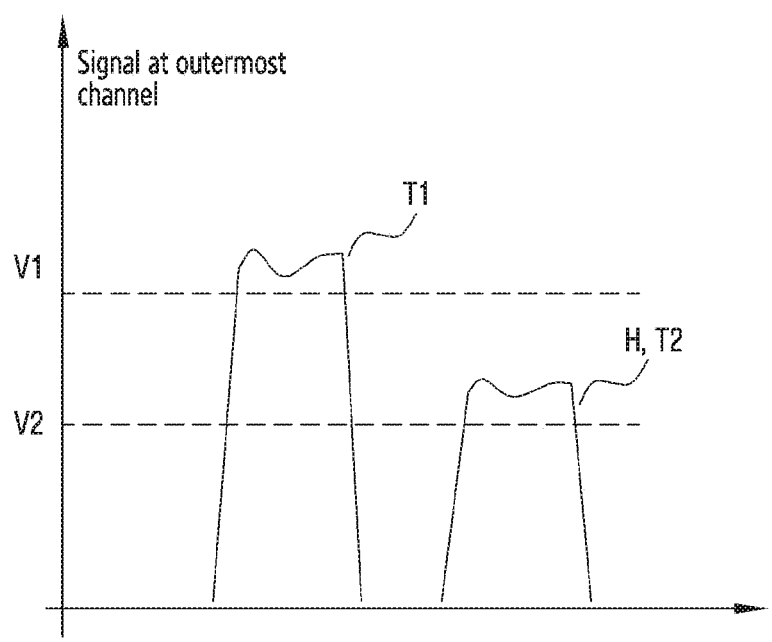
FIG. 4B illustrates a graph showing characteristics of signals generated at an outermost channel of a touch panel according to an embodiment.
Figure 4C:
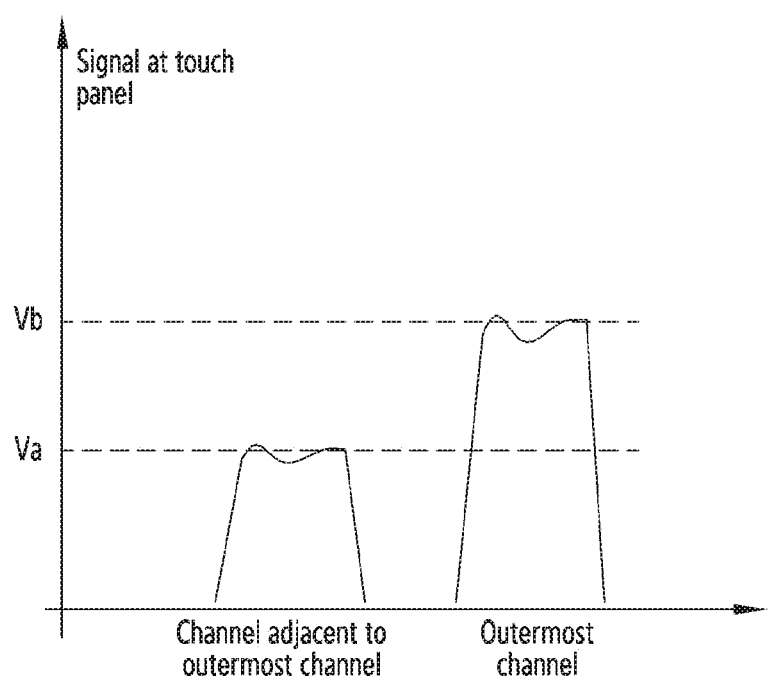
FIG. 4C illustrates a graph comparing a signal generated at an outermost channel and a signal generated at a channel close to the outermost channel in the touch panel according to an embodiment.

FIG. 4A illustrates an enlargement of area B in FIG. 3 according to an embodiment. FIG. 4B illustrates a graph showing characteristics of signals generated at an outermost channel of a touch panel according to an embodiment. FIG. 4C illustrates a graph comparing a signal generated at an outermost channel and a signal generated at a channel close to the outermost channel in the touch panel according to an embodiment.

Referring to FIG. 4A, the electronic device 300 can determine the type of touch input, based on at least one of the magnitude of a signal sensed through the touch panel 330, the region in which a signal has been generated, or whether there is a moving touch. When a signal exceeding a specific critical value is generated, the electronic device 300 can sense the signal as a touch input. When the touch input is sensed, the electronic device 300 can determine which region of the cover window 320 the touch input has occurred in. The electronic device 300 can determine the type of touch input, based on whether a moving touch following an initial touch is sensed. A moving touch may correspond to movement of touch coordinates that are obtained through the touch panel 330 while a touch is maintained.

Referring to FIGS. 4B and 4C, the electronic device 300 can compare the magnitude of a signal generated from the touch panel 330 with a first critical value V1 to sense touch input. When the magnitude of a signal exceeds the first critical value V1, the electronic device 300 can sense touch input and perform an operation corresponding to the touch input.

The distance d2 between the outermost channel 332 of the touch panel 330 and a finger, when a touch T2 is generated in the second region 322, may be larger than the distance d1 between the outermost channel 332 of the touch panel 330 and a finger, when a touch T1 is input in the second sub-region 321-2. Accordingly, the signal generated at the outermost channel 332 by the touch input T2 in the second region 322 may be lower than the first critical value V1. Therefore, when the electronic device 300 senses touch input, based on the first critical value V1, it may not sense touch input occurring in the second region 322.

The electronic device 300 can sense touch input in the second region 322. The electronic device 300 can sense touch input occurring in the second region 322 by comparing a signal due to a touch T2 in the second region 322 with a second critical value V2, which is lower than the first critical value V1. n Even though a signal lower than the first critical value V2 is generated at the outermost channel 332 of the touch panel 330 by touch input, the electronic device 300 can recognize the signal as a touch input.

When a finger approaches the second sub-region 321-2 with a gap from the surface of the cover window 320 (hereafter, hover) H, a signal larger than the second critical value V2 for sensing touch input that is generated in the second region 322 may be generated at the outermost channel 332. However, a signal generated in the second sub-region 321-2 and exceeding the second critical value V2 is caused by hover H, not by a touch, so the electronic device 300 should not determine that as a touch input. Accordingly, when a signal exceeding the second critical value V2 is generated at the outermost channel 332 by the touch input, the electronic device 300 should know whether the signal has been generated in the second sub-region 321-2 or has been generated in the second region 322.

When the electronic device 300 senses a signal exceeding the second critical value V2 through the outermost channel 332, the electronic device 300 can recognize the region in which the signal has been generated by comparing a signal Vb generated at the outermost channel 332 and a signal Va generated at a channel 331 adjacent to the outermost channel 332.

When the ratio of the signal Vb generated at the outermost channel 332 to the signal Va generated at the channel 331 adjacent to the outermost channel 332 exceeds a predetermined value, the electronic device 300 can determine that the signal has been generated in the second region 322. When the ratio of the signal Vb generated at the outermost channel 332 to the signal Va generated at the channel 331 adjacent to the outermost channel 332 is within the predetermined value, the electronic device 300 can determine that the signal has been generated in the second sub-region 321-2.

When a signal sensed at the outermost channel 332 exceeds the first critical value V1, the electronic device 300 can recognize that touch input has occurred in the second sub-region 321-2. When the signal Vb sensed at the outermost channel 332 exceeds the second critical value V2 and the ratio of the signal Vb generated at the outermost channel 332 to a signal Va generated at the channel 331 adjacent to the outermost channel 332 exceeds the predetermined value, the electronic device 300 can recognize that a touch input has occurred in the second region 322.

The electronic device 300 can determine the type of sensed touch input by determining whether the touch input includes movement of touch coordinates. For example, when first touch input is sensed in the second sub-region 321-2 and includes a moving touch following an initial touch, the electronic device 300 can determine the first touch input as a second type of touch. However, when the first touch input does not include a moving touch following the initial touch, the electronic device 300 can determine the first touch input as a first type of touch.

Because it may initially be unclear whether the first touch input is a first type of touch or a second type of touch when the initial touch of the first touch input has been sensed in the second sub-region 321-2, the electronic device 300 can recognize the first touch input as one of a first type of touch or a second type of touch in accordance with a moving touch following the initial touch.

The electronic device 300 can determine the touch input sensed in the first region as a first type of touch. For example, a touch input exceeding the first critical value and generated in the first sub-region 321-1 may be a first type of touch.

The electronic device 300 can determine a touch input sensed in the second sub-region as a second type of touch when the touch input includes a moving touch. For example, a touch input exceeding the first critical value, generated in the second sub-region 321-2, and including a moving touch may be a second type of touch. A touch input exceeding the first critical value and generated in the second sub-region 321-2, but not including a moving touch, may be a first type of touch.

The electronic device 300 can determine a touch input sensed in the second region 322 as a second type of touch when the touch input includes a moving touch. For example, a touch input exceeding the second critical value, generated in the second region 322, and including a moving touch, may be a second type of touch.

Figure 5:
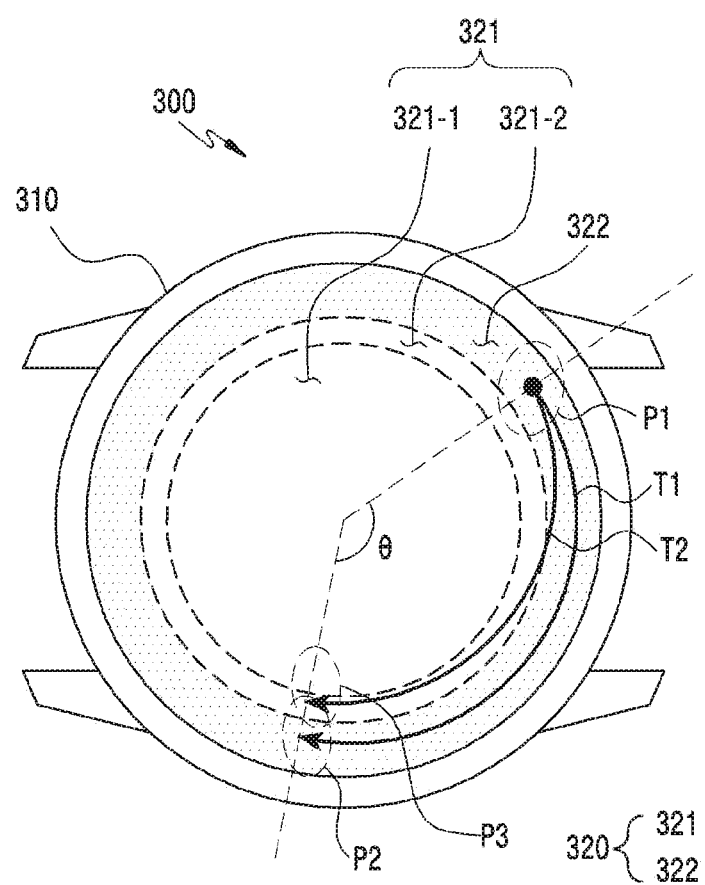
FIG. 5 illustrates a second type of touch starting in a second region of a cover window in an electronic device according to an embodiment.

FIG. 5 illustrates a second type of touch started from a second region of a cover window in an electronic device according to an embodiment.

Referring to FIG. 5, an electronic device 300 includes a housing 310, a cover window 320 forming the surface of the housing 310, a touch panel disposed under the cover window 320, a display disposed under the cover window 320 and shown from the outside through the cover window 320, a circuit board in the housing, at least one processor mounted on the circuit board, and/or a haptic device mounted on the circuit board.

The cover window 320 has a first region 321 corresponding to the touch panel 330 (or the display 340) and a second region 322 corresponding to a bezel region 380 in which the touch panel (or the display 340) does not exist. The second region 322 of the cover window 320 is a region not overlapping the touch panel, and the touch panel and/or the display may not be disposed under the second region 322.

The first region 321 of the cover window 320 includes a first sub-region 321-1 corresponding to a first group of the channels of the touch panel and a second sub-region 321-2 corresponding to a second group of the channels of the touch panel. The second group may correspond to outer channels of the channels of the touch panel and the first group may correspond to channels excluding the outer channels of the channels of the touch panel. The second group may correspond to outermost channels disposed the most outside of the channels of the touch panel and the first group may correspond to channels excluding the outermost channels of the channels of the touch panel.

When a signal exceeding a second critical value (e.g., the second critical value V2 of FIG. 4B) is sensed at a channel of the touch panel which corresponds to a first point P1 at a first point in time, the electronic device 300 can sense the signal as touch input T1 or T2.

When initial touches of a first touch input T1 and a second touch input T2 are sensed in the second region 322 and include a moving touch, the electronic device 300 can determine that the first touch input T1 and the second touch input T2 as second type of touches, regardless of the route of the moving touch. For example, the moving touches of the touch inputs T1 and T2 can be generated in the second region 322 and in the first region 321.

The electronic device 300 can determine the first touch input T1 as a second type of touch, based on the first touch input T1 moving from a first point P1 in the second region 322 to a second point P2 in the second region 322. The first touch input T1 may include touch input sensed at the first point P1 at the first point in time, drag input moving from the first point to the second point P2 from the first point in time to the second point in time, and input released at the second point P2 at the second point in time.

The electronic device 300 can determine the second touch input T2 as a second type of touch, based on the second touch input T2 moving from the first point P1 in the second region 322 to a third point P3 in the first region 321. The second touch input T2 may include a touch input sensed at the first point P1 at the first point in time, a drag input moving from the first point to the third point P3 from the first point in time to the second point in time, and an input released at the third point P3 at the second point in time.

The electronic device 300 can determine the first touch T1 as a second type of touch when the angle θ between the first point P1 and the second point P2 from the center of the cover window 320 is greater than or equal to a predetermined angle. For example, when the angle θ between the first point P1 and the second point P2 from the center of the cover window 320 is 15 degrees or more, the electronic device 300 can determine the first touch input T1 as a second type of touch and generate an event corresponding to the second type of touch.

The second type of touch may include a touch moving from the first point P1 to the second point P2, stopping at the second point P2 for a predetermined time, and then moving to the third point P3 while the touch is maintained. The movement direction of the second type of touch may include a clockwise direction, a counterclockwise direction, and a combination thereof. For example, the second type of touch may include a touch moving clockwise and then moving counterclockwise while the touch is maintained. As another example, the second type of touch may include a touch moving clockwise, then moving counterclockwise, and finally moving clockwise while the touch is maintained.

The route of the second type of touch is not limited to the embodiments described above and may be varied.

Figure 6:
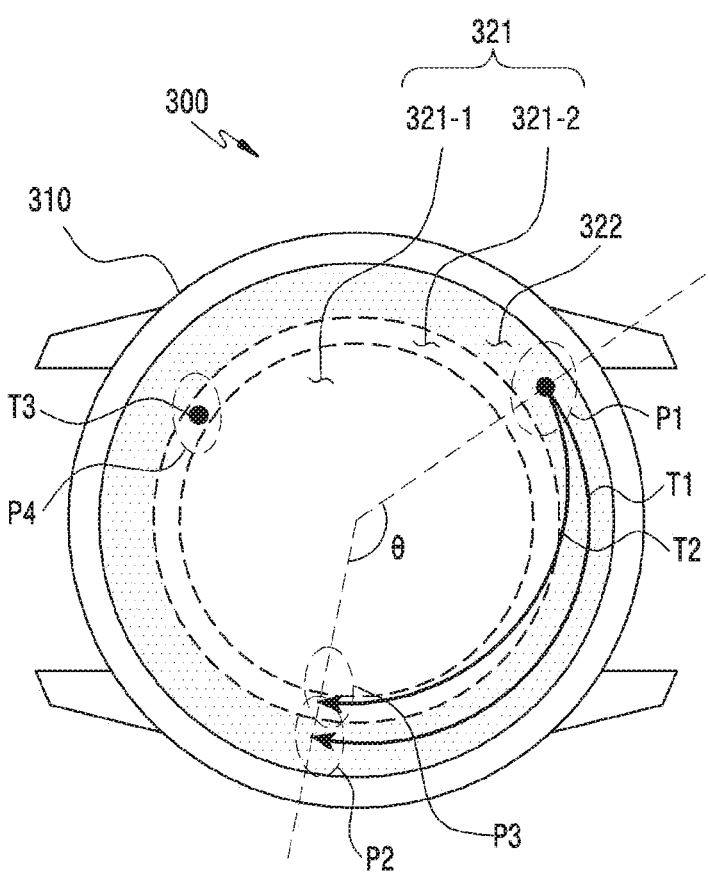
FIG. 6 illustrates a second type of touch starting in a region of a cover window in an electronic device according to an embodiment.

FIG. 6 illustrates a second type of touch starting in a second sub-region of a cover window in an electronic device according to an embodiment. Since much of FIG. 6 is similar to FIG. 5, repeated descriptions of FIG. 5 are omitted below.

Referring to FIG. 6, when a signal exceeding a first critical value (e.g., the first critical value V1 of FIG. 4B) is sensed at a channel of the touch panel, which corresponds to a first point P1 in the second sub-region 321-2 at a first point in time, the electronic device 300 can sense the signal as touch input T1 or T2.

When initial touches of a first touch input T1 and a second touch input T2 are sensed in the second sub-region 321-2 and include a moving touch, the electronic device 300 can determine that each of the first touch input T1 and the second touch input T2 is a second type of touch, regardless of the route of the moving touch. For example, the moving touches of the touch inputs T1 and T2 can be generated in the second sub-region 321-2 and in the first sub-region 321-10 and/or the second region 322.

The electronic device 300 can determine the first touch input T1 as a second type of touch, based on the first touch input T1 moving from the first point P1 to the second point P2 in the second sub-region 321-2, following the initial touch input at the first point P1 in the second sub-region 321-2 at the first point in time.

The electronic device 300 can determine the second touch input T2 as a second type of touch, based on the second touch input T2 moving from the first point P1 to the third point P3 in the second region 322, following the initial touch input at the first point P1 in the second sub-region 321-2 at the first point in time.

When a signal exceeding a first critical value (e.g., the first critical value V1 of FIG. 4B) is sensed at a channel of the touch panel which corresponds to a fourth point P4 in the second sub-region 321-2, the electronic device 300 can sense the signal as touch input T2.

The electronic device 300 can determine a third touch input T3 as a first type of touch, based on the third touch input T3 not moving after the initial touch input at the first point P1 in the second sub-region 321-2.

Figure 7:
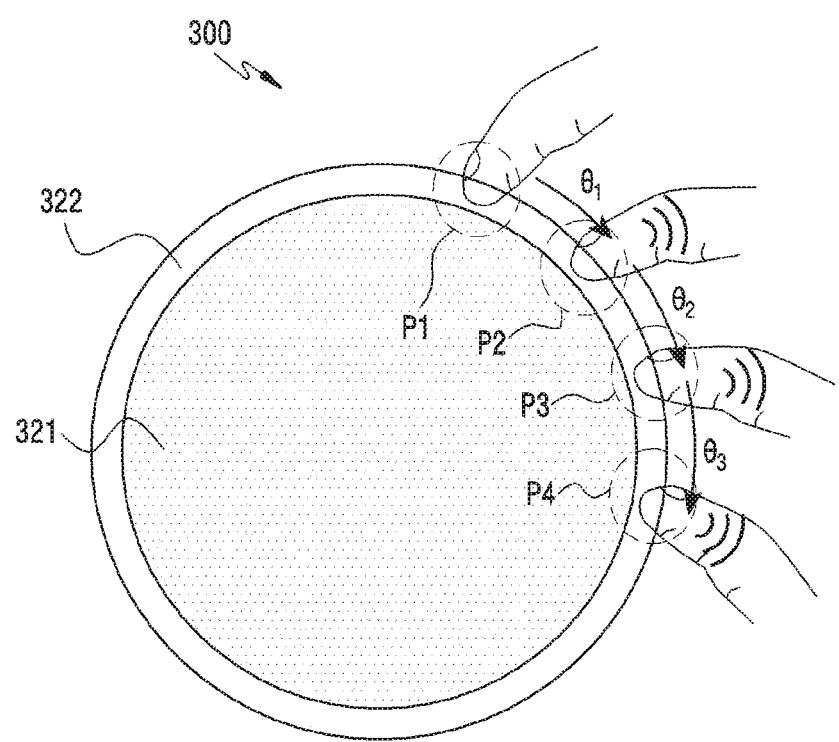
FIG. 7 illustrates haptic feedback corresponding to a second touch input according to an embodiment.

FIG. 7 illustrates haptic feedback corresponding to a second type of touch according to an embodiment.

Referring to FIG. 7, a processor of the electronic device 300 can provide feedback related to an event corresponding to a second type of touch to a user by vibrating the electronic device 300 through a haptic device while the event corresponding to the second type of touch is generated.

The electronic device 300 can adjust the intensity and/or frequency of the vibration that is generated through the haptic device, based on at least one of the moving speed and acceleration of a touch.

Vibrations can be generated, based on the movement distance of a second type of touch while an event corresponding to the second type of touch is generated. For example, it is possible to generate vibrations at the second point P2 moving at first angle θ1 from the first point P1 and generate vibrations at the third point P3 moving at a second angle θ2 from the second point P2. The first angle θ1 and the second angle θ2 may be the same.

When there are an upper limit and a lower limit in the operation in the UI related to the event corresponding to the second type of touch, the electronic device 300 can inform a user that the operation in the UI has reached the upper limit or the lower limit by generating vibration through the haptic device when the second type of touch reaches the lower limit or the upper limit. The electronic device 300 can generate vibrations with a first intensity through the haptic device before the second type of touch reaches the upper limit or the lower limit, and can generate vibrations with a second intensity when the second type of touch reaches the upper limit or the lower limit. For example, when the fourth point P4 corresponds to the lower limit of the second type of touch, the electronic device 300 can generate vibrations through the haptic device in response to the second type of touch reaching the fourth point P4. The intensity of the vibrations generated at the fourth point P4 may be larger than the intensity of the vibrations generated at the second point P2 and the third point P3.

The pattern of vibration that is generated through the haptic device while the event corresponding to the second type of touch is generated is not limited to the embodiments described above and may be varied.

The processor of the electronic device 300 can provide feedback related to an event corresponding to the second type of touch to a user by generating a sound through a sound device (e.g., a speaker) in the electronic device 300 while the event is generated.

Figure 8:
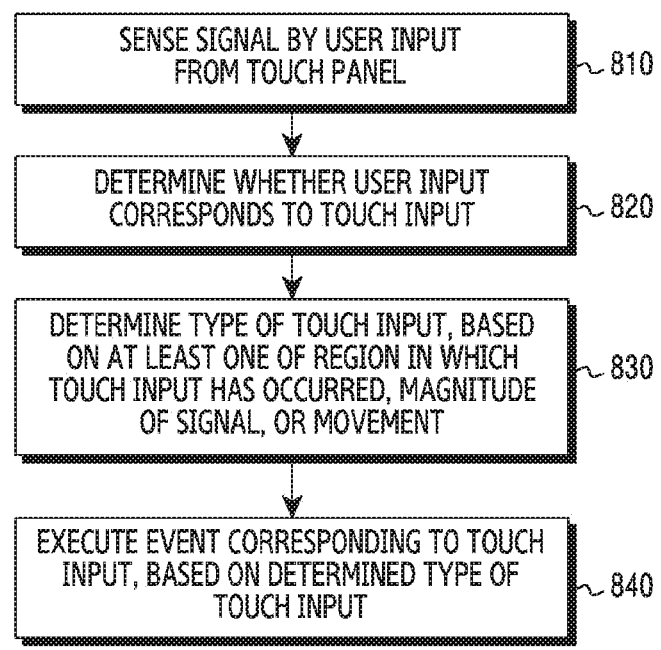
FIG. 8 is a flow chart illustrating a method of executing an event corresponding to a touch input generated in an electronic device according to an embodiment.

FIG. 8 is a flow chart illustrating a method of executing an event corresponding to a touch input in an electronic device according to an embodiment.

Referring to FIG. 8, a processor of an electronic device can sense a signal that is generated at a touch panel by a touch input in step 810. When a user's finger approaches a cover window, the touch panel can generate a signal in response to a change of the capacitance due to the approach of the user's finger, and the processor included in the electronic device can sense a corresponding signal. The touch panel can sense the approach of a user's finger and/or a touch pen or stylus pen of the user, and contact between a finger and a cover window which is described hereafter may include contact between the cover window and a touch pen, etc.

In step 820, the processor can determine whether the signal generated in step 810 has been generated by contact between a user's finger and a touch screen by comparing the signal sensed in step 810 with a specific critical value. Since the touch screen is substantially protected by a cover window having predetermined strength to protect hardware (a panel), the contact between a finger and the touch screen can be understood as contact between the finger and a portion of the cover window corresponding to the touch screen.

When a signal sensed at a specific channel of a plurality of channels included in the touch panel of the touch screen has touch sensitivity lower than a first critical value (e.g., the first critical value V1 of FIG. 4B), the electronic device can ignore the signal without recognizing the signal as a touch input. When a signal sensed at a specific channel, e.g., channels included in a first group exceeds the first critical value, the electronic device can identify the signal as a touch input. The channels included in the first group may be channels of the touch panel that are disposed in a predetermined range from the center of the touch screen.

In step 820, the processor can sense a touch input having touch sensitivity smaller than the first critical value, but larger than a second critical value (e.g., the second critical value V2 of FIG. 4B). For example, when a signal sensed at some channels of the channels included in the touch panel has a touch sensitivity between the first critical value and the second critical value, the processor can use the sensed signal to perform a designated function. When a signal sensed at some channels, e.g., channels included in a second group has touch sensitivity between the first critical value and the second critical value, the electronic device can determine the touch input as a second type of touch. The channels included in the second group may be channels of the touch panel that are disposed outside a predetermined range from the center of the touch screen. In various embodiments, the channels included in the second group may be disposed farthest outside of the touch screen or the other channels not included in the first group.

In step 830, the processor determines the type of the sensed touch input. The electronic device can determine whether a touch input is a second type of touch, based on at least one of the region in which the touch input occurs, the magnitude of a signal corresponding to the touch input, and whether the touch input moves in a predetermined direction or at a predetermined angle from the point in time when the touch input has been initially sensed.

In step 840, the processor generates an event corresponding to the touch input, based on the determined type of the touch input. The event corresponding to the second type of touch may include rotation, scroll, etc., of an object displayed on the display. While the event is generated, the processor can control a haptic device of the electronic device to generate vibration corresponding to the event.

Figure 9:
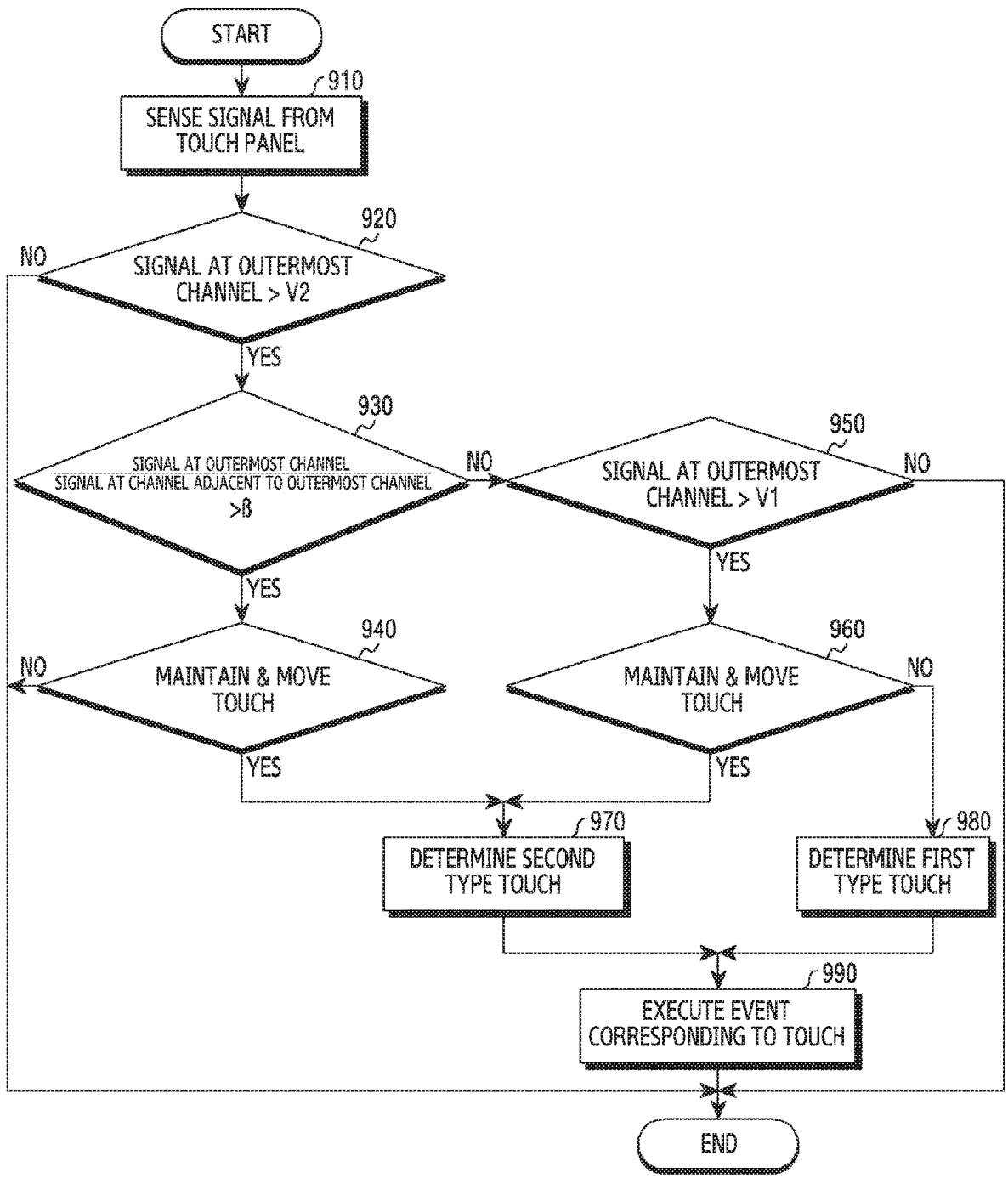
FIG. 9 is a flowchart illustrating a method for determining a type of touch input sensed by a touch panel in an electronic device according to an embodiment.

FIG. 9 is a flowchart illustrating a method for determining a type of touch input sensed by a touch panel in an electronic device according to an embodiment. For example, the method of FIG. 9 will be described below with reference to FIGS. 3, 4A, 4B, and 4C.

Referring to FIG. 9, in step 910, the processor 360 senses a signal based on a user input from the touch panel 330.

In step 920, the processor 360 determines whether a signal Vb generated at the outermost channel 332 exceeds the second critical value V2. When the signal Vb is not great than the second critical value V2, the signal is not be recognized as a touch input.

When the signal Vb generated at the outermost channel 332 is greater than the second critical value V2 in step 920, the processor 360 determines whether a ratio of the signal Vb generated at the outermost channel 332 to a signal Va generated at the channel 331 adjacent to the outermost channel 332 is greater than a predetermined value β in step 930.

When the ratio of the signal Vb generated at the outermost channel 332 to the signal Va generated at the channel 331 adjacent to the outermost channel 332 is greater than the predetermined value β in step 930, the processor 360 determines that the signal has been generated in the second sub-region 321-2 and determines whether a touch input sensed in the second region 322 includes a moving touch in step 940.

When the touch input includes the moving touch in step 940, the processor 360 determines the touch input sensed in the second region 322 as a second type of touch in step 970.

When the ratio of the signal Vb generated at the outermost channel 332 to the signal Va generated at the channel 331 adjacent to the outermost channel 332 is not greater than the predetermined value β, the processor 360 determines whether the signal Vb sensed at the outermost channel 332 exceeds a first critical value V1 in step 950.

When the signal Vb sensed at the outermost channel 332 exceeds the first critical value V1 in step 950, the processor 360 recognizes that the touch input has occurred in the second sub-region 321-2 and determines whether the touch input sensed in the second sub-region 321-2 includes a moving touch in step 960.

When the touch input includes the moving touch in step 960, the processor 360 determines the touch input sensed in the second sub-region 321-2 as a second type of touch in step 970.

However, when the touch input does not include the moving touch in step 960, the processor 360 determines the touch input sensed in the second sub-region 321-2 as a first type of touch in step 980.

In step 990, the processor 360 executes an event corresponding to the determined type of touch input.

An electronic device according to an embodiment includes a housing; a touch panel disposed in the housing; a display disposed in the housing; a cover window disposed on the touch panel and having a first region corresponding to the touch panel and a second region corresponding to a region outside the touch panel in which the first region includes a first sub-region corresponding to an inner region of the touch panel and a second sub-region corresponding to an outer region of the touch panel; and a processor operationally combined with the touch panel and the display, in which the processor may be configured to: provide a user interface through the display; obtain a signal by touch input from the touch panel while the user interface is provided; determine a region in which the touch input has initially occurred, based on the signal; determine the touch input larger than a first critical value as a first type of touch in response to the fact that the touch input has initially occurred in the first sub-region; execute an event corresponding to the first type of touch, based on the user interface and the first type of touch; sense whether the touch input includes movement of touch coordinates in response to the fact that the touch input has initially occurred in the second sub-region or the second region; determine the touch input as a second type of touch discriminated from the first type of touch in response to the touch input includes movement of the touch coordinates; and execute an event corresponding to the second type of touch, based on the user interface and the second type of touch.

The touch panel of the electronic device may include a plurality of channels; the plurality of channels may include a first group corresponding to channels adjacent outermost channels of the plurality of channels and a second group corresponding to the outermost channels of the plurality of channels; and the processor may be further configured to: obtain a first signal and a second signal by the touch input from the first group and the second group; determine that the touch input has occurred in the second sub-region in response to the fact that the magnitude of the second signal is larger than the first critical value; and determine that the signal has been generated in the second region in response to the fact that magnitude of the second signal exceeds a second critical value lower than the first critical value and a ratio of the magnitude of the second signal to magnitude of the first signal exceeds a predetermined value.

The movement of the touch coordinates may correspond to movement over a predetermined angle about a center of the touch panel.

The processor may be further configured to ignore touch input that is input to the cover window while the second type of touch is input and is different from the second type of touch input.

The event corresponding to the second type of touch may include at least one of selecting, changing, switching, scrolling, moving, enlarging, or reducing a portion or the entire of the user interface in accordance with the second type of touch.

The event corresponding to the second type of touch may include an event that is generated while the user interface is maintained.

The electronic device may further include a haptic device operationally combined with the processor, in which the processor may be further configured to control the haptic device to generate vibration, based on the second type of touch while executing the event corresponding to the second type of touch.

The processor may be further configured to control the haptic device to generate vibration, based on at least one of a movement distance of the second type of touch, a speed of the second type of touch, and acceleration of the second type of touch.

The processor may be further configured to: sense whether the second type of touch reaches an upper limit or a lower limit when there is the upper limit or the lower limit related to the second type of touch in the user interface; control the haptic device to generate vibration with first intensity before the second type of touch reaches the upper limit or the lower limit; and control the haptic device to generate vibration with second intensity different from the first intensity when the second type of touch reaches the upper limit or the lower limit.

The second type of touch may pass through the first region and/or the second region.

A method of controlling an electronic device including a cover window, a touch panel, and a display in accordance with an embodiment may include providing a user interface through the display; obtaining a signal by touch input from the touch panel while the user interface is provided; determining a region in which the touch input has initially occurred, based on the signal; determining the touch input larger than a first critical value as a first type of touch in response to the fact that the touch input has initially occurred in a first sub-region corresponding to an inner region of the touch panel, and executing an event corresponding to the first type of touch, based on the user interface and the first type of touch; sensing whether the touch input includes movement of touch coordinates in response to the fact that the touch input has initially occurred in a second sub-region corresponding to an outer region of the touch panel or in a second region corresponding to a region outside the touch panel; determining the touch input as a second type of touch discriminated from the first type of touch in response to the fact that the touch input includes movement of the touch coordinates; and executing an event corresponding to the second type of touch, based on the user interface and the second type of touch.

The method may further include obtaining a first signal and a second signal by the touch input respectively from a first group corresponding to channels adjacent to outermost channels of a plurality of channels included in the touch panel and a second group corresponding to the outermost channel of the plurality of channels; determining that the touch input has occurred in a second sub-region in response to the fact that magnitude of the second signal is larger than the first critical value; and determining that the signal has been generated in the second region in response to the fact that the magnitude of the second signal exceeds a second critical value lower than the first critical value and a ratio of the magnitude of the second signal to magnitude of the first signal exceeds a predetermined value.

The movement of the touch coordinates may correspond to movement over a predetermined angle about a center of the touch panel.

The event corresponding to the second type of touch may include at least one of selecting, changing, switching, scrolling, moving, enlarging, or reducing a portion or the entire of the user interface in accordance with the second type of touch.

The event corresponding to the second type of touch may include an event that is generated while the user interface is maintained.

The movement of the touch coordinates may correspond to movement over a predetermined angle about a center of the touch panel.

The method may further include controlling a haptic device of the electronic device to generate vibration, based on the second touch input while executing the event corresponding to the second type of touch.

The method may further include controlling the haptic device to generate vibration, based on at least one of a movement distance of the second type of touch, a speed of the second type of touch, and acceleration of the second type of touch.

The method may further include sensing whether the second type of touch reaches an upper limit or a lower limit when there is the upper limit or the lower limit related to the second type of touch in the user interface; controlling the haptic device to generate vibration with first intensity before the second type of touch reaches the upper limit or the lower limit; and controlling the haptic device to generate vibration with second intensity different from the first intensity when the second type of touch reaches the upper limit or the lower limit.

The second type of touch may pass through the first region and/or the second region.

An electronic device according to various embodiments can accurately select an object displayed on a display of the electronic device through touch input that is input in an outer region or a bezel region of the display.

An electronic device according to various embodiments also provides a wheel touch that can operate a user interface disposed on the display without a user's finger covering the display, thereby being able to make a user more accurately control the electronic device. In particular, in a wearable electronic device having a small display, a user can control the electronic device to follow his/her intension by touching the outer region of a cover window without directly touching the inner portion of the display with a finger.

The scope of protection is defined by the appended independent claims. Further features are specified by the appended dependent claims. Example implementations can be realized comprising one or more features of any claim taken jointly and severally in any and all permutations.

The examples described in this disclosure include non-limiting example implementations of components corresponding to one or more features specified by the appended independent claims and these features (or their corresponding components) either individually or in combination may contribute to ameliorating one or more technical problems deducible by the skilled person from this disclosure.

Furthermore, one or more selected component of any one example described in this disclosure may be combined with one or more selected component of any other one or more example described in this disclosure, or alternatively may be combined with features of an appended independent claim to form a further alternative example.

Further example implementations can be realized comprising one or more components of any herein described implementation taken jointly and severally in any and all permutations. Yet further example implementations may also be realized by combining features of one or more of the appended claims with one or more selected components of any example implementation described herein.

In forming such further example implementations, some components of any example implementation described in this disclosure may be omitted. The one or more components that may be omitted are those components that the skilled person would directly and unambiguously recognize as being not, as such, indispensable for the function of the present technique in the light of a technical problem discernible from this disclosure. The skilled person would recognize that replacement or removal of such an omitted components does not require modification of other components or features of the further alternative example to compensate for the change. Thus further example implementations may be included, according to the present technique, even if the selected combination of features and/or components is not specifically recited in this disclosure.

Two or more physically distinct components in any described example implementation of this disclosure may alternatively be integrated into a single component where possible, provided that the same function is performed by the single component thus formed. Conversely, a single component of any example implementation described in this disclosure may alternatively be implemented as two or more distinct components to achieve the same function, where appropriate.

Methods disclosed in the claims and/or methods according to various embodiments described in the specification of the disclosure may be implemented by hardware, software, or a combination of hardware and software. When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a CD-ROM, digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, a LAN, a Wide LAN (WLAN), a Storage Area Network (SAN), or a combination thereof. Such a storage device may access the electronic device via an external port. Further, a separate storage device on the communication network may access a portable electronic device.

In the above-described detailed embodiments of the disclosure, an element included in the disclosure may be expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although certain embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

What is claimed is:

1. An electronic device, comprising:
    a touch panel;
    a display;
    a cover window disposed on the touch panel, the cover window including a first region corresponding to the touch panel and a second region corresponding to a region outside the touch panel, and wherein the first region includes a first sub-region corresponding to an inner region of the touch panel and a second sub-region corresponding to an outer region of the touch panel; and
    a processor configured to:
        provide a user interface through the display,
        obtain a signal corresponding to a touch input from the touch panel while the user interface is provided,
        determine a region in which the touch input initially occurred, based on the signal,
        in response to determining that the touch input initially occurred in the first sub-region, determine whether the magnitude of the signal is greater than a first critical value, identify the touch input as a first type of touch in response to the magnitude of the signal being greater than the first critical value, and execute an event corresponding to the first type of touch, based on the user interface, and
        in response to determining that the touch input initially occurred in the second sub-region or the second region, determine whether the touch input includes movement of touch coordinates, identify the touch input as a second type of touch distinguished from the first type of touch in response to the touch input including the movement of the touch coordinates, and execute an event corresponding to the second type of touch, based on the user interface.

2. The electronic device of claim 1, wherein the touch panel of the electronic device includes a plurality of channels,
wherein the plurality of channels includes a first group corresponding to channels adjacent outermost channels of the plurality of channels and a second group corresponding to the outermost channels of the plurality of channels, and
wherein the processor is further configured to:
obtain a first signal and a second signal corresponding to the touch input from the first group and the second group,
determine that the touch input has occurred in the second sub-region in response to the magnitude of the second signal being larger than the first critical value, and
identify that the signal has been generated in the second region in response to the magnitude of the second signal exceeding a second critical value, which is lower than the first critical value, and a ratio of the magnitude of the second signal to magnitude of the first signal exceeding a predetermined value.

3. The electronic device of claim 1, wherein the movement of the touch coordinates includes movement over a predetermined angle about a center of the touch panel.

4. The electronic device of claim 1, wherein the processor is further configured to ignore a touch input that is input to the cover window while the second type of touch is input and is different from the second type of touch input.

5. The electronic device of claim 1, wherein the event corresponding to the second type of touch includes at least one of selecting, changing, switching, scrolling, moving, enlarging, or reducing at least a portion of the user interface in accordance with the second type of touch.

6. The electronic device of claim 1, wherein the event corresponding to the second type of touch is generated while the user interface is maintained.

7. The electronic device of claim 1, further comprising a haptic device,
wherein the processor is further configured to control the haptic device to generate vibrations, based on the second type of touch while executing the event corresponding to the second type of touch.

8. The electronic device of claim 7, wherein the processor is further configured to:
sense whether the second type of touch reaches an upper limit or a lower limit related to the second type of touch in the user interface,
control the haptic device to generate vibrations with a first intensity before the second type of touch reaches the upper limit or the lower limit, and
control the haptic device to generate vibrations with a second intensity that is different from the first intensity, when the second type of touch reaches the upper limit or the lower limit.

9. A method of controlling an electronic device including a cover window, a touch panel, and a display, the method comprising:
providing a user interface through the display;
obtaining a signal corresponding to a touch input from the touch panel while the user interface is provided;
determining a region in which the touch input initially occurred, based on the signal;
in response to determining that the touch input initially occurred in a first sub-region corresponding to an inner region of the touch panel, determining whether the magnitude of the signal is greater than a first critical value, identifying the touch input as a first type of touch in response to the magnitude of the signal being greater than the first critical value, and executing an event corresponding to the first type of touch, based on the user interface; and
in response to determining that the touch input initially occurred in a second sub-region corresponding to an outer region of the touch panel or in a second region corresponding to a region outside the touch panel, determining whether the touch input includes a movement of touch coordinates, identifying the touch input as a second type of touch distinguished from the first type of touch in response to the touch input including the movement of the touch coordinates, and executing an event corresponding to the second type of touch, based on the user interface.

10. The method of claim 9, further comprising:
obtaining a first signal and a second signal corresponding to the touch input respectively from a first group corresponding to channels adjacent to outermost channels of a plurality of channels included in the touch panel and a second group corresponding to the outermost channel of the plurality of channels;
determining that the touch input has occurred in the second sub-region in response to a magnitude of the second signal being greater than the first critical value; and
determining that the touch input has occurred in the second region in response to the magnitude of the second signal exceeding a second critical value that is lower than the first critical value and a ratio of the magnitude of the second signal to magnitude of the first signal exceeding a predetermined value.

11. The method of claim 9, wherein the movement of the touch coordinates includes movement over a predetermined angle about a center of the touch panel.

12. The method of claim 9, wherein the event corresponding to the second type of touch includes at least one of selecting, changing, switching, scrolling, moving, enlarging, or reducing at least a portion of the user interface in accordance with the second type of touch.

13. The method of claim 9, wherein the event corresponding to the second type of touch is generated while the user interface is maintained.

14. The method of claim 9, further comprising controlling a haptic device of the electronic device to generate vibrations, based on the second type of touch while executing the event corresponding to the second type of touch.

15. The method of claim 14, further comprising:
determining whether the second type of touch reaches an upper limit or a lower limit related to the second type of touch in the user interface;
controlling the haptic device to generate vibrations with a first intensity before the second type of touch reaches the upper limit or the lower limit; and
controlling the haptic device to generate vibrations with a second intensity, which is different from the first intensity, when the second type of touch reaches the upper limit or the lower limit.

16. The electronic device of claim 7, wherein the processor is further configured to control the haptic device to generate vibrations, based on at least one of a movement distance of the second type of touch, a speed of the second type of touch, and acceleration of the second type of touch.

17. The electronic device of claim 1, wherein the second type of touch passes through at least one of the first region and/or the second region.

18. The method of claim 14, further comprising controlling the haptic device to generate vibration, based on at least one of a movement distance of the second type of touch, a speed of the second type of touch, and acceleration of the second type of touch.

19. The method of claim 9, wherein the second type of touch passes through at least one of the first region and the second region.

* * * * *